United States Patent [19]

Groom

[11] 4,370,116

[45] Jan. 25, 1983

[54] TONNAGE INDICATOR FOR INJECTION MOLDING MACHINE

[75] Inventor: James S. Groom, Wales, Mass.

[73] Assignee: Package Machinery Company, East Longmeadow, Mass.

[21] Appl. No.: 310,891

[22] Filed: Oct. 13, 1981

[51] Int. Cl.³ .................. B29F 1/06; B30B 15/14; B30B 15/22; B30B 15/28

[52] U.S. Cl. .................. 425/171; 425/150; 425/167; 425/450.1; 425/589

[58] Field of Search ............... 425/150, 167, 169, 171, 425/450.1, 451.2, 451.5, 451.6, 451.9, 135, 589, 590, 591, 592, 593, 595

[56] References Cited

U.S. PATENT DOCUMENTS

| 3,604,058 | 9/1971 | Fischback | 425/150 |
|---|---|---|---|
| 3,642,405 | 2/1972 | Eggenberger | 425/167 X |
| 3,840,313 | 10/1974 | Grundmann et al. | 425/171 |
| 3,881,852 | 5/1975 | Ahrweiler | 425/150 X |
| 3,910,736 | 10/1975 | Stächelin et al. | 425/451.2 X |
| 4,017,236 | 4/1977 | Penkman et al. | 425/150 |
| 4,088,432 | 5/1978 | Farrell | 425/150 X |
| 4,131,596 | 12/1978 | Allen | 425/150 X |
| 4,222,730 | 9/1980 | Hehl | 425/450.1 |
| 4,281,977 | 8/1981 | Farrell | 425/150 X |

Primary Examiner—J. Howard Flint, Jr.
Attorney, Agent, or Firm—McCormick, Paulding & Huber

[57] ABSTRACT

A structure for measuring the load imposed on mold halves in a plastic injection molding machine when engaged to define a mold cavity, the machine being of a type wherein a movable die platen is driven along supporting tie rods to carry one mold half toward and away from a fixed die platen carrying the other mold half. The measuring is accomplished by a sensor engaging one end of one tie rod to sense any movement thereof under an imposed load condition.

8 Claims, 4 Drawing Figures

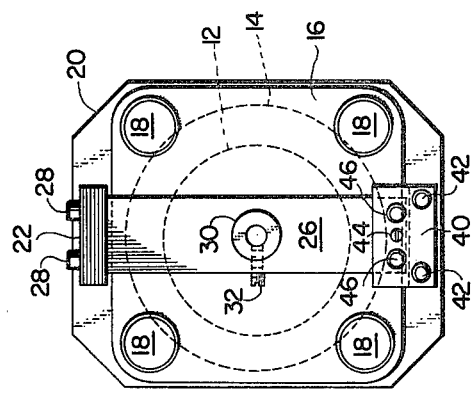
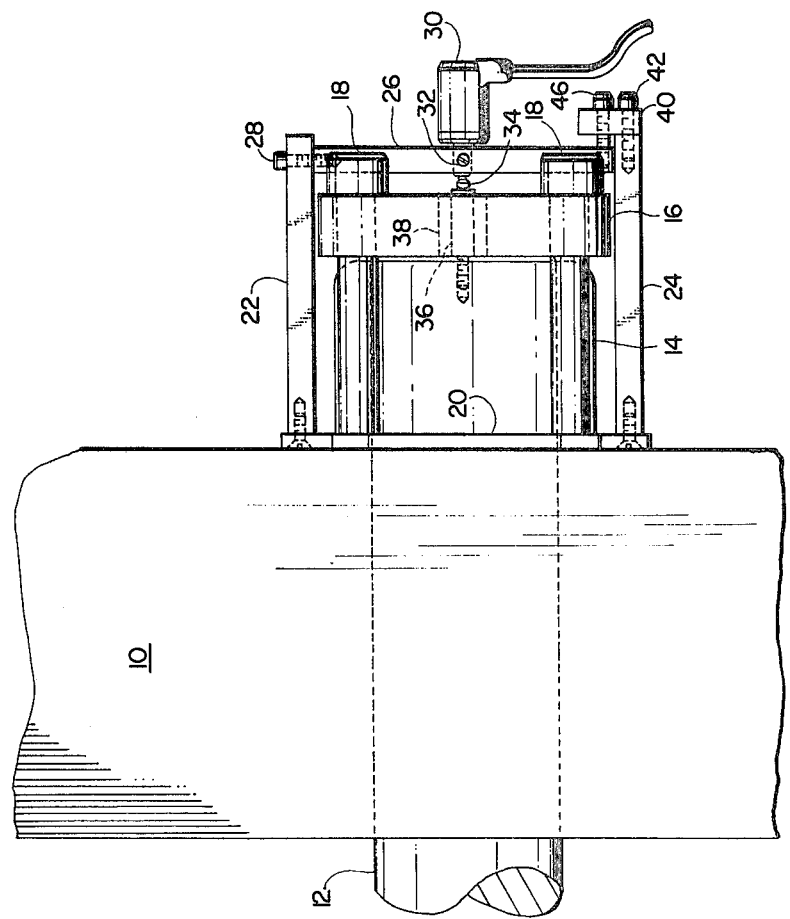

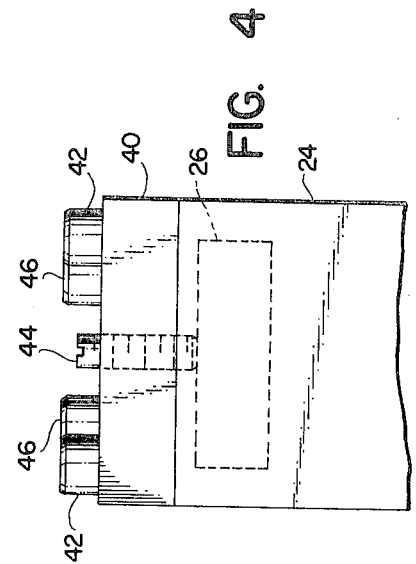
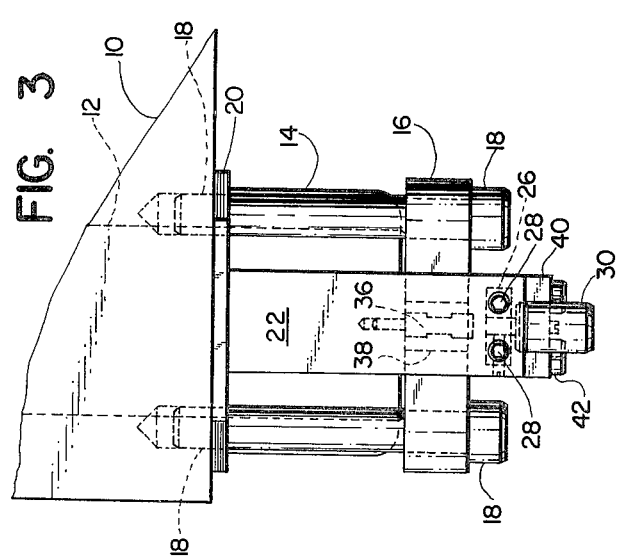

TONNAGE INDICATOR FOR INJECTION MOLDING MACHINE

BACKGROUND OF THE INVENTION

It is well known that most plastic injection molding machines have a heavy frame supporting a plurality (usually four) of horizontal tie bars which accommodate relative movement between die plates or platens respectively supporting the two half elements of a mold. A first such platen is supported in a fixed location on the tie bars and is referred to as the fixed platen, while the other platen is movable toward and away from the fixed platen along the tie bars. The platens support the mold halves so that they will become engaged and define the mold cavity when the movable platen is driven toward the fixed platen to engage the complementary mold halves. The mold halves are engaged under a heavy force load to prevent separation of the mold halves when plastic material is injected in the cavity, and the machines are often rated in tons, this giving an indication of the closing force load within the capacity of one machine as compared to that of another machine.

The lockup or mold engaging force can be read directly if the movable die platen is hydraulically driven, i.e., by a reading of the hydraulic force employed. However, in those injection molding machines wherein the movable die platen is reciprocated on the tie bars by mechanical linkages, there is no means of obtaining a direct reading of the tonnage or load applied when the mold halves are engaged.

In the past, a tonnage or force reading on the mechanical linkage machines was obtained by drilling a deep hole along the axis of a tie bar and using an indicator coupled to a long sensing rod thrust into the hole to indicate the stretch of a tie bar when load tonnage is applied. A deep hole in the tie bar being used is necessary in order to provide enough total stretch to give a usable displacement for the indicator reading. In such installation, the readout is tied to a specific length of bar being measured, that is the length or depth of the hole, and the actual working length of the tie bar changes with molds of different dimension. As a result, inaccurate readings are provided for any but the mold for which the hole was initially made.

SUMMARY OF THE INVENTION

In accordance with this invention, an extremely sensitive indicator-sensor is supported to engage the end of a tie bar projecting through the first or fixed die platen. The projecting end of the tie bar is threaded, as are the same ends of the other tie bars, and a nut is threaded over the projecting end portion of each tie bar to engage the adjacent surface of the fixed platen or a plate imposed between the platen and the nut. The nut is placed in compression under an initial load by means drawing the fixed platen toward the projecting ends of the tie bars.

The indicator-sensor is supported in engagement with the end of one of the tie bars and is calibrated to provide a "0" reading on the end of the tie bar under the initial load condition imposed on the nut. Then, when the mechanical linkage drives the movable die platen to engage the mold halves, the load imposed across the mold halves causes further compression of the nut which is measured by any movement of the end of the tie bar. Such movement will be indicated by the sensor and can be read directly in terms of pounds or tons. As will be described, the sensed movement of the end of the tie bar or the compression of the nut can be utilized as a signal for controlling machine operation and not merely as a readout.

DESCRIPTION OF THE DRAWINGS

FIG. 1 is a side elevational view showing a portion of the fixed die platen and a tie bar associated with it, the indicator-sensor being associated with the said tie bar.

FIG. 2 is an end view of the indicator-sensor structure shown in FIG. 1.

FIG. 3 is a top view of the structure shown in FIGS. 1 and 2; and

FIG. 4 is an enlarged bottom view of a portion of the frame structure supporting the indicator-sensor.

THE PREFERRED EMBODIMENT

In FIGS. 1 and 3, there is shown a portion of a fixed die platen 10 and a portion of a tie rod 12 which is one of a plurality of tie rods used to support the fixed platen 10 and along which a second or movable platen (not shown) is slided. The tie bar 12 extends through the platen 10 in a sliding fit and has a threaded end portion receiving a tie bar nut 14.

All of the tie bars used in the machine have a similar support relationship with the fixed platen 10 and each has a nut 14 threaded on each such tie bar so that the threaded end of the tie bar extends a slight distance beyond the outer face of the nut. Each such tie bar is secured relative to the fixed platen by means of a first vertical plate 16 which engages the end surface of the tie bar and through which a plurality of headed bolts 18, 8 slidably extend into threaded engagement with the platen 10 in suitable tapped openings therein. By applying selected torque to the bolts 18, 18, the platen 10 is drawn toward the end of each of its tie bars tending to compress each nut 14 under an initial load condition. The tie bar and nut arrangement is the same for all tie bars except one which is used to measure the tonnage under imposed load conditions. This is the tie bar 12 shown in the various views of the drawing. In connection or association with the tie bar 12 a second plate 20 is used. This plate loosely embraces the tie bar 12 and is clamped between the platen 10 and the nut 14 and is thus mounted to support the frame structure for the indicator-sensor to be described.

Turning now to the indicator-sensor means and its support structure or frame, it will be seen that the said frame includes upper and lower horizontal bars 22 and 24 which are suitably supported by the mounting plate or second plate 20 to extend well beyond the threaded end of the tie bar 12 and the nut retaining plate 16. The vertical bar 26 is secured as by bolts or cap screws 28, 28 to the top bar 22 so as to be suspended therefrom, the said vertical bar 26 reaching nearly to the bottom bar 24. The indicator-sensor 30 is mounted in a suitable opening in the vertical bar 26 and secured therein as by a set screw 32. The said indicator-sensor has a probe element 34 projecting toward the end of the tie bar 12 and engaging a plug 36 which is threaded into a suitable tapped opening in the end of the tie bar. The plug 36 projects through a large opening 38 in the first plate or nut retaining plate 16. In keeping with conventional structure, the indicator-sensor element or probe 34 is biased toward engagement with the end of the plug 36 so as to maintain engagement therewith when the tie bar 12 moves. The preferred indicator-sensor comprises a transducer using electromagnetic principles to measure displacement, and it is a commercially available item.

In further accord with the invention, the vertical frame bar 26 is arranged for slight adjustment toward and away from the end of the tie bar 12. That is, a cross piece 40 is rigidly mounted on the end of the bottom bar 24 as by cap screws 42, 42 and it threadably receives a horizontal adjustment and set screw 44 which bears against the outer surface of the vertical bar 26 near the lower end thereof. The cross piece 40 also receives a pair of cap screws 46, 46 which are threaded into suitably tapped apertures at the bottom end of the vertical frame bar 26.

As will be readily understood from the drawings, when the cap screws 46, 46 are loosened the set screw can be advanced or retracted relative to the cross piece 40 whereby to effect very limited movement of the vertical frame bar 26. This movement of the frame bar 26 is for the purpose of calibrating the indicator 30 to a "0" reading under the initial load condition described above tending to compress the nut 14. When the "0" calibration has been effected, the cap screws 46, 46 are tightened to maintain the position of the vertical frame bar 26. Thereafter, any longitudinal movement of the tie bar 12 will be shown on the indicator 30 which can be calibrated in terms of pounds or tonnage reflecting the load or compressive force placed on the nut 14.

As mentioned earlier, the sensor cannot only be used as an indicator. It can also be used to create a signal for control purposes. That is, displacement of the tie bar and accompanying compression of the nut as sensed by the unit 30 can be used as a signal to an electrical circuit to prevent the molding machine being used at a tonnage level for which it is not designed and rated. Further, the displacement can be used to sense a "flash" or "about to flash" condition of the mold while plastic material is being injected into the mold cavity. In order for a mold to "flash" there must be an excessive internal load in the cavity tending to separate the mold halves and thus to stretch the tie bar. Accordingly, the indicator-sensor can be used to sense the difference between a safely fully packed mold which increases tonnage slightly over the preapplied mold closing load and a mold which has flashed or is about to flash. This signal could be utilized to control operation of the machine in a closed loop circuit to change molding variables such as pressure, injection time, temperature, etc.

Further, the signal produced by displacement of the end of the tie bar can be used in closed loop circuitry to prevent overload on the mold in the initial or lockup condition before plastic is injected into the cavity. Likewise, the signal can be used to prevent injection to a mold if for any reason the lockup force is less than it should be to prevent flashing.

I claim:

1. In a plastic injection molding machine having first and second die platens respectively carrying complementary mold parts which are engageable to define a mold cavity, at least one tie bar mounted on the frame of the machine to extend slidably through the platens and having a threaded end portion projecting beyond the first such platen, a nut threaded on said end portion, first means exerting a force between the said first platen and said nut tending to compress the nut under an initial load, the second platen being driven reciprocably along said tie bar whereby to forcefully engage the mold parts to receive injected plastic material in their defined cavity and to separate the mold parts for removal of a plastic article formed in the cavity, and means including a sensor to detect axial movement of the threaded end of the tie bar and thereby to measure compression of said nut caused by the force load across the mold parts when engaged and as such load may be altered by the pressure of plastic material injected into the mold cavity.

2. The improvements in a molding machine as set forth in claim 1 wherein said first means comprises a first plate engaging the threaded end of the tie bar, a plurality of headed bolts extending through said plate and threaded into said first platen in circumaxially spaced relationship around the tie bar and in radially spaced relationship to the tie bar, whereby upon applying selected torque to said bolts the said initial load is imposed on said nut.

3. The structure defined in claim 2 wherein the plate engaging the end of the tie bar is spaced from the nut.

4. The improvements as defined in claims 1, 2 or 3 wherein the means including the sensor comprises a mounting frame supporting the sensor for adjustment relative to the threaded end of the tie bar, thereby to provide calibration of tie bar axial movement and nut compression caused by departure from the said initial load condition.

5. The structure of claim 4 wherein the mounting frame includes a sensor-supporting element which is manually adjustable relative to the rest of the mounting frame to move the sensor relative to the tie bar.

6. The structure of claim 5 wherein the sensor includes an element biased toward engagement with the end of the tie bar so as to be movable therewith.

7. The improvements in a molding machine as defined in claims 2 or 3 wherein the means including the sensor comprises a mounting frame having a second plate clamped between the nut and the said first platen, first and second frame elements mounted on said second plate, and a third frame element supported by said first and second frame elements to support the sensor relative to the end of the tie bar, the sensor having an element biased toward engagement with the end of the tie bar so as to be movable therewith and thus to sense tie bar axial movement and nut compression caused by departure from the said initial load condition.

8. The structure of claim 7 wherein the said third frame element is adjustable to a selected fixed position relative to the first and second frame elements and thereby to set the position of the sensor relative to the tie bar for calibration of the sensed tie bar axial movement and nut compression.

* * * * *